United States Patent Office 3,403,097
Patented Sept. 24, 1968

3,403,097
PROCESS FOR REGENERATION OF CATION EXCHANGE RESIN
Takashi Yamashiki, Yokohama, and Hiroshi Ono, Kawasaki-shi, Japan, assignors to Asahi Kasei Kogyo Kabushiki Kaisha, Osaka, Japan, a corporation of Japan
No Drawing. Filed Mar. 3, 1966, Ser. No. 531,380
Claims priority, application Japan, Mar. 5, 1965, 40/12,422
2 Claims. (Cl. 210—33)

ABSTRACT OF THE DISCLOSURE

A process for regeneration of a cation exchange resin in a continuous ion exchange operation, wherein the resin is regenerated by sulfuric acid which contains 20–100 p.p.m. of sodium phosphate glass.

---

The present invention relates to an improved process for regenerating a cation resin adsorbing calcium ion by sulfuric acid in a continuous ion exchange process.

At present, a process for desalting of industrial water and manufacturing pure water occupies a large field in resin utilization.

In the aforesaid process, in order that saturated cation resins may be regenerated by sulfuric acid without precipitation of calcium sulfate, it has been required hitherto to utilize various ideas regarding the concentration of sulfuric acid.

Calcium sulfate has only extremely small solubility, therefore calcium ion eluted from resin in the regeneration step associates with $SO_4^{--}$ of sulfuric acid and causes calcium sulfate to precipitate in said step. The said precipitate becomes an origin inducing a blockage of the regenerant flow in the regeneration column and an inconvenient resin transfer.

It increases the consumption of sulfuric acid to use sulfuric acid of a dilute concentration and this is not only uneconomical, but also requires an abundant amount of water for diluting the sulfuric acid.

It is an object of the present invention to raise the concentration of sulfuric acid used for the regeneration and to thereby promote the regeneration efficiency and to facilitate a continuous operation by adding a stabilizing agent of super saturation.

The present inventors examined, on occasion that Ca ion adsorbed resin is regenerated by sulfuric acid in a regeneration column, what influences are present under various conditions by a surplus of sulfuric acid remaining in a treating solution to the solubility of calcium sulfate in a treating solution, and they discovered that a limiting solubility produce to control a formation of calcium sulfate precipitate can be remarkably increased by adding a supporter of over saturation in the sulfuric acid, while providing a regenerant solution into the column and exhausting it as a treating solution, whereby a regeneration is smoothly exercised without a formation of precipitate even in the case of employment of high concentration of sulfuric acid as a regenerating solution.

Then, the principle in this respect is explained as follows:

Generally, a solubility product Lp of calcium sulfate in a treating solution is represented by the following formula;

$$L_p = \phi \frac{c^2}{R} \quad (1)$$

wherein $\phi$ is a ratio of decalcium ion equivalent in proportion to total deion equivalent, $c$ is a concentration of sulfuric acid used herein and R is a ratio of total deion equivalent in proportion to equivalent of sulfuric acid used as a regenerating solution.

Provided that a limiting solubility product under a definite condition is expressed by $L_{lim}$, $L_{lim}$ is ruled by three conditions, namely, (1) a concentration of remaining $H^+$ in a treating solution, (2) $Ca^{++}/SO_4^{--}$ in a treating solution and (3) other inorganic cations existing together with Ca ion in a treating solution, for example, such as $Na^+$ or $Mg^{++}$.

Provided that other inorganic ion existing together with Ca ion in a treating solution is assumed as only $Na^+$, $L_{lim}$ is expressed by a function which is independently determined under a certain concentration of $H^+$ and a certain concentration of $Na^+$, and $L_{lim}$ does not depend on $Ca^{++}/SO_4^{--}$, because if $H^+$ and $Na^+$ are determined, $CA^{++}/SO^{--}$ is determined accordingly, as is clear by the following Formulas 2, 3 and 4.

$$L_{lim} = f(H^+, Na^+) \quad (2)$$

$$H^+ = SO_4^{--} - (Ca^+ + Na^+) \quad (3)$$

$$L_{lim} = (SO_4^{--}) \times (Ca^{++}) \quad (4)$$

$$f(H^+, Na^+) > \phi \frac{c^2}{R} \quad (5)$$

The Formula 5 represents a limiting condition, wherein a regeneration can be exercised without a formation of calcium sulfate precipitate.

On the other hand, it is confirmed by the inventors that a factor of $Na^+$ does not give almost any influence on on limiting solubility product, provided that a concentration of inorganic salt is 0.3 equivalent/l. or less in a treating solution.

Consequently, only a concentration of $H^+$ in a treating solution should be considered as a variable to rule a limiting solubility product.

A relation between an acidity of sulfuric acid and a limiting solubility product is cited, for reference, in Table 1.

TABLE 1

| Acidity of sulfuric acid (N) | 0.1 | 0.2 | 0.3 | 0.4 | 0.5 | 0.6 | 0.7 | 0.8 | 0.9 | 1.0 |
|---|---|---|---|---|---|---|---|---|---|---|
| Limiting solubility product ($\times 10^{-2} N^2$) | 0.67 | 1.23 | 1.77 | 2.22 | 2.61 | 3.08 | 3.40 | 3.70 | 4.00 | 4.30 |

To increase an acidity of sulfuric acid in a treating solution means that the utilization efficiency of sulfuric acid is decreased.

The raising of an utilization efficiency of sulfuric acid means a decrease of acidity of sulfuric acid remaining in the treating solution and also a decrease of limiting solubility product. As the result, the precipitation of calcium sulfate may be greatly possible. This fact made is necessary to use a low concentration of sulfuric acid and had effected the economical difficulty of regeneration of ion exchange resin by sulfuric acid.

But the inventors discovered that when "Sodium phosphate glass vz. hexamethaphosphate" as a supporter of over saturation in range of 20 p.p.m. to 100 p.p.m. is mixed in sulfuric acid as a regenerating solution, a limiting solubility product can be conspicuously raised under a low acidity of sulfuric acid and a most effective result is obtained by employing 25 p.p.m. of the aforesaid stabilizing agent.

A relation between an acidity of sulfuric acid and a limiting solubility product, in the case of adding 100 p.p.m. of sodium phosphate glass into sulfuric acid, is indicated in Table 2.

TABLE 2

| Acidity of sulfuric acid (N) | 0.06 | 0.11 | 0.22 | 0.32 | 0.39 | 0.67 | 0.88 |
|---|---|---|---|---|---|---|---|
| Limiting solubility product ($\times 10^{-2} N^2$) | 2.9±0.2 | 3.1±0.2 | 3.3±0.2 | 3.9±0.2 | 5.9±0.2 | 9.3±0.2 | 11.5±0.2 |

As disclosed manifestly in the above table, a limiting solubility product can be increased in range of 2.5 to 3.0 times, in comparison with a case that said sodium phosphate glass is not added as in Table 1, and thereby a regeneration of resin can be carried out smoothly and economically, without formation of calcium sulfate precipitate maintaining high utilization efficiency of sulfuric acid.

And, the said sodium phosphate glass is subject to a hydrolysis in an acidic solution and a stabilizing ability of super saturation is lost, but according to the experiments of the inventors, it is found that, when a concentration of acid is 1.0 N or less and a temperature of solution does not exceed 50° C., the hydrolysis decomposition rate is 20% or less in lapse of one hour; and adopted for a continuous ion exchange process in accordance with the present invention, is in contact with acid in the very short period of time without any loss of the ability and it is not necessary to take into account a decrease of a stabilizing of super saturation.

This is clearly disclosed in the experimental data of Table 3 and the decomposition rates (percent) under the variables of an acidic concentration, a temperature and an elapsed time are indicated in this table.

TABLE 3

| Elapsed time (minutes) | Acid concentration and temperature | | | |
|---|---|---|---|---|
| | 0.1 N at 50° C., decomposition rate (percent) | 1.0 N at 50° C., decomposition rate (percent) | 0.1 N at 70° C., decomposition rate (percent) | 1.0 N at 70° C., decomposition rate (percent) |
| 5 | 2.3 | 3.3 | 5.2 | 14.2 |
| 10 | 2.9 | 6.4 | 9.6 | 32.1 |
| 20 | 4.5 | 12.8 | 14.2 | 52.2 |
| 30 | 5.7 | 18.6 | 22.9 | 69.3 |
| 60 | 9.5 | 35.4 | 38.2 | 96.6 |
| 120 | 16.9 | 60.5 | 52.7 | 100 |
| 180 | 25.7 | 78.0 | 71.3 | 100 |
| 240 | 30.4 | 100 | 76.6 | |
| 300 | 37.5 | 100 | 84.9 | |
| 360 | 42.7 | | 100 | |

The industrial water used commonly contains ions of $Ca^{++}$, $Mg^{++}$ and $Na^+$ and is desalted by a continuous ion exchange process and for example, when it is regenerated by hydrochloric acid, hydrochloric acid is used in range of 170% to 200% of equivalent, in proportion to total decation equivalent and those are average values in the present industrial scale.

Whereas, a consumption of $H_2SO_4$ of approximately 218% is needed in accordance with the present invention for producing pure water of $1 \times 10^5 \Omega$ cm. and 308% for producing pure water of $5 \times 10^5 \Omega$ cm.

At present, a cost ratio of hydrochloric acid per sulfuric acid is approximately 2.3:1 in equivalent base therefore the process of the present invention is capable of reducing a cost of regeneration to from 47.5% to 79% to the cost of hydrochloric acid used process.

The examples are cited subsequently and the process of the present invention is more particularly explained thereby.

Example 1

An apparatus by U.S. Patent No. 3,152,072 was employed.

In a continuous ion exchange process which comprises adsorption operation and regeneration operation, cation resin Amberlite IR-120B (saled by Organo Co., Ltd., Japan) was circulated between the above two operation columns. Industrial water was fed upwardly from a lower entrance of the adsorption column and came into contact countercurrently with regenerated cation resin from regeneration column. And it was exhausted from an outlet at the upper part of said column as pure water.

On the other hand, sulfuric acid as a regenerating solution was fed from a central part of regeneration column and came into contact countercurrently with saturated resin.

The resin regenerated was intermittently transferred downwardly in the regeneration column and was rinsed by water at the lower part of regeneration column.

The sulfuric acid supplied from an entrance of regenerating solution was prepared in such manner that approximately 19 N of sulfuric acid which was fed quantitatively by a metering pump at one meter distance from the said entrance, was mixed with one part of decationized water and futhermore a solution of a concentrated sodium phosphate glass (trade name: "Calgon" of Organo Co., Ltd., Japan) was poured in it so that the regenerating solution contained 25 p.p.m. of Calgon in the regeneration column.

The conditions of regeneration for the regenerating operation are specificed as follows:

Amount of circulated resins _____ 16.8 l./hr.
Concentration of supplied sulfuric
  acid _____ 19.05 N.
Amount of supplied sulfuric acid __ 1.27 l./hr.
thereby,
Equivalent of supply _____ 24.2 equivalent/hr.
Exhausted amount of treated waste
  water discharged from a regeneration column _____ 92.4 l./hr.
Amount of water transferred from
  an adsorbing column accompanied
  by resin _____ 13.4 l./hr.
Amount of regenerating solution
  coming up in the regeneration
  column _____ 79.0 l./hr.
Total concentration in a regeneration column _____ 0.314 N.
Resin composition after regeneration:
  $H^+$ _____ 0.698 equivalent/l. resin.
  $Ca^{++}+Mg^{++}$ _____ 1.476 equivalent/l. resin.
  $Na^+$ _____ 0.039 equivalent/l. resin.

The conditions of adsorbing operation are specified as follows:

Amount of circulated resin _____ 16.8 l./hr.
Composition of raw water:
  $Ca^{++}+Mg^{++}$ _____ 2.10 milli-equivalent/l.
  $Na^+$ _____ 1.25 milli-equivalent/l.
Amount of raw water to be deionized _____ 3.45 m.³/hr.
Resin compositions after adsorption:
  $H^+$ _____ 0.002 equivalent/l. resin.
  $Ca^{++}+Mg^{++}$ _____ 1.897 equivalent/l. resin.
  $Na^+$ _____ 0.272 equivalent/l. resin.
Purity of product water _____ 7.15μ cm.⁻¹ or less.
Utilizing capacity of resin _____ 0.696 equivalent/l. resin.
Utilization rate of resin _____ 0.319.
Consumption of regenerant _____ 218% of desalted equivalent.
Solubility product of calcium sulfate
  in a regeneration column _____ 0.024 $N^2$.

Example 2

Similarly as the process in Example 1, the operations were exercised and the conditions of regenerating operation and adsorbing operation were specified as follows.

Regenerating conditions in the regenerating operation:

| | |
|---|---|
| Amount of circulated resin | 12.0 l./hr. |
| Concentration of supplied sulfuric acid | 19.20 N. |
| Amount of supplied sulfuric acid | 2.03 l./hr. |
| Thereby, equivalent of supply | 39.0 equivalent/hr. |
| Exhausted amount of treated waste water discharged from a regeneration column | 101.0 l./hr. |
| Amount of water transferred from an adsorbing column accompanied by resin | 9.6 l./hr. |
| Amount of regenerating solution coming up in the regeneration column | 91.4 l./hr. |
| Total concentration in a regeneration column | 0.449 N. |

Resin composition after regeneration:

| | |
|---|---|
| $H^+$ | 1.057 equivalent/l. resin. |
| $Ca^{++}+Mg^{++}$ | 1.090 equivalent/l. resin. |
| $Na^+$ | 0.017 equivalent/l. resin. |
| Concentration of "Calgon" in the column | 25 p.p.m. |

The conditions of adsorbing operation are as follows:

| | |
|---|---|
| Amount of circulated resin | 12.0 l./hr. |

Compositions of raw water:

| | |
|---|---|
| $Ca^{++}+Mg^{++}$ | 2.20 milliequivalent/l. |
| $Na^+$ | 1.45 milliequivalent/l. |
| Amount of raw water to be deionized | 3.45 m.³/hr. |

Resin compositions after adsorption:

| | |
|---|---|
| $H^+$ | 0.002 equivalent/l. resin. |
| $Ca^{++}+Mg^{++}$ | 1.597 equivalent/l. resin. |
| $Na^+$ | 0.514 equivalent/l. resin. |
| Purity of product water | 1.67µ cm.⁻¹ or less. |
| Utilizing capacity of resin | 1.055 equivalent/l. resin. |
| Utilization rate of resin | 0.491. |
| Consumption of regenerant | 308% of desalted equivalent. |
| Solubility product of calcium sulfate in a regeneration column | 0.0232 N². |

Example 3

In the same continuous type of ion exchange operation, similarly as in the processes in Examples 1 and 2, a surplus amount of $CaCl_2$ solution prepared artificially was fed from the entrance at the lower part of the adsorption column and then, it was devised that the resin transferred from the adsorption column to the regeneration column may be saturated with calcium only. Following the processes in Examples 1 and 2, the entirely same operation was applied to the regeneration column and thereby the regeneration of resin was carried out.

The conditions in the regeneration column were as follows:

| | |
|---|---|
| Amount of circulated resin | 16.8 l./hr. |
| Concentration of supplied sulfuric acid | 19.25 N. |
| Amount of supplied sulfuric acid | 1.21 l./hr. |
| Thereby, equivalent of supply | 23.2 equivalent/hr. |
| Exhausted amount of treated waste water discharged from a regeneration column | 129.6 l./hr. |
| Amount of water transferred from an adsorbing column accompanied by resin | 13.5 l./hr. |
| thereby, | |
| Amount of regenerating solution coming up in the regeneration column | 116.1 l./hr. |
| Total concentration in a regeneration column | 0.172 N. |

Resin composition after regeneration:

| | |
|---|---|
| $H^+$ | 0.573 equivalent/l. resin. |
| $Ca^{++}+Mg^{++}$ | 1.630 equivalent/l. resin. |

Compositions of resin introduced into the regeneration column:

| | |
|---|---|
| $H^+$ | 0. |
| $Ca^{++}$ | 2.178 equivalent/l. resin. |
| Concentration of "Calgon" | 50 p.p.m. |
| thereby, | |
| Utilizing capacity of resin | 0.573 equivalent/l. resin. |
| Utilization rate of resin | 0.263 equivalent/l. resin. |
| Consumption of regenerant | 242% of desalted equivalent. |
| Solubility product of calcium sulfate in a regeneration column | 0.0133 N². |

Approximately 500 ml. of resin regenerated thereby were taken out and rinsed sufficiently by pure water and then they were filled into a column of 21 mm. of inside diameter. An industrial water ($Ca^{++}+Mg^{++}$:2.20 milliequivalent/l., $Na^+$:1.27 milliequivalent/l.) was fed downwardly into the column from its top end and then the effluent of said column was further introduced into another column, into which completely regenerated anion exchange resin (Amberlite IRA 400) was filled.

A purity of treated water obtained was average conductivity of 0.8 to 1.0µ ℧cm.⁻¹.

It is evidently understood that the cation resin after regeneration has had a sufficient ability of decationization.

What we claim is:

1. A process for regeneration of cation exchange resin in a continuous ion exchange operation wherein a solution containing at least calcium ion is deionized by contact countercurrently with the cation exchange resin while the resin adsorbed cation is regenerated by sulfuric acid, which comprises adding sodium phosphate glass to be 20 to 100 p.p.m. to the sulfuric acid as a regenerant just before the regenerant is fed to the regeneration step.

2. A process for regeneration of cation exchange resin according to claim 1, wherein the sodium phosphate glass is added to 25 p.p.m. to the sulfuric acid as a regenerant.

References Cited

UNITED STATES PATENTS

| | | | |
|---|---|---|---|
| 2,413,784 | 1/1947 | Rawlings et al. | 210—38 X |
| 3,152,072 | 10/1964 | Yamiyama et al. | 210—33 |
| 3,216,931 | 11/1965 | Dennis et al. | 210—30 |
| 3,316,171 | 4/1967 | Mastrorilli | 210—38 X |

FOREIGN PATENTS 488,149  11/1952  Canada.

REUBEN FRIEDMAN, *Primary Examiner.*

F. SPEAR, *Assistant Examiner.*